H. D. COOKE & A. FORNANDER.
APPARATUS FOR TREATING MILK.
APPLICATION FILED MAR. 23, 1907.
Patented Nov. 3, 1908.
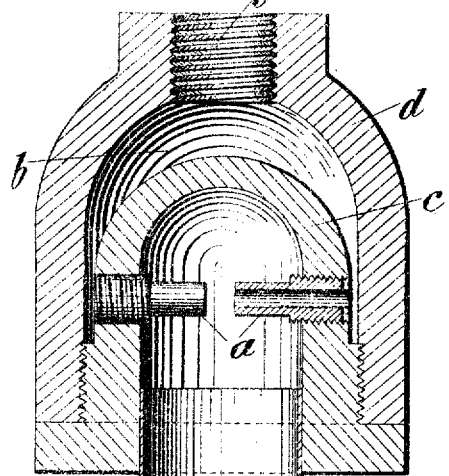
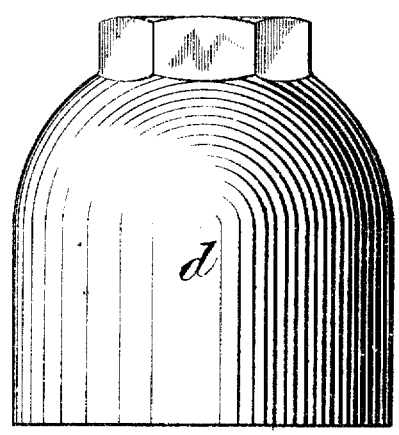
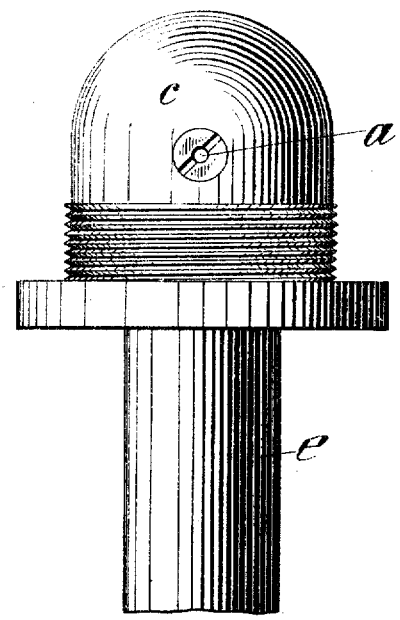

UNITED STATES PATENT OFFICE.

HENRY D. COOKE, OF MONMOUTH BEACH, NEW JERSEY, AND ALFRED FORNANDER, OF NEW YORK, N. Y.

APPARATUS FOR TREATING MILK.

No. 902,858.  Specification of Letters Patent.  Patented Nov. 3, 1908.

Application filed March 23, 1907. Serial No. 364,189.

*To all whom it may concern:*

Be it known that we, HENRY D. COOKE, a citizen of the United States, and a resident of Monmouth Beach, in the State of New Jersey, and ALFRED FORNANDER, a citizen of the United States, and a resident of the borough of Manhattan, of the city of New York, in the county and State of New York, have invented certain new and useful Improvements in Apparatus for Treating Milk, of which the following is a specification, reference being had to the accompanying drawings, forming a part hereof.

The object of this invention is to provide a simple device by means of which one body of milk may be impacted against another body of milk under considerable pressure. Milk, after being thoroughly treated in this manner, will yield up its fat, that is butter fat, upon subjecting it to heat; and it is our belief after careful investigation that the violent impacting against each other of the fat globules in the milk serves to break or rupture these globules whereby through heating the butter fat can be extracted.

The apparatus will be more fully described in connection with the accompanying drawing illustrating the same and in which, Figure 1 is a broken view partly in section and partly in elevation, Fig. 2 is a view in elevation of a cap which forms a part of the apparatus, and, Fig. 3 is a similar view of the head or body portion upon which the cap fits.

The present apparatus is provided with two nozzles $a$ which constitute outlets for a reservoir $b$ formed between a body piece $c$ and a cap $d$ threaded thereon. These nozzles are in line with each other and are therefore directed towards each other so that the milk discharging from the nozzles will impact against itself, the one body of milk which is being discharged from one nozzle striking the other body of milk which is being discharged from the other nozzle. These nozzles lead from the reservoir $b$ into the interior of the body piece $c$ which is made hollow for the purpose and a conduit $e$ is preferably provided so as to conduct the milk or the products thereof after the impact has taken place from the interior to some suitable vessel or container.

The reservoir is provided with an inlet $f$ which is connected with a source of milk supply and in the operation of the apparatus, it will be understood that the milk is introduced through the inlet into the reservoir under pressure, the degree of which is sufficient to effect the desideratum which has been stated above.

It will be understood that the form of the apparatus may be varied considerably without departing from the spirit of the invention.

We claim as our invention:

1. The combination of a cap provided with an inlet, a body piece having a hollow interior forming a closure for said cap, an outlet from the interior of said body piece, and two nozzles through said body piece arranged opposite each other, substantially as described.

2. The combination of a hemispherical body piece having a hollow interior, two nozzles leading from the periphery of the body piece into the interior and directed toward each other, a conduit leading from said interior, a cap threaded to the body piece and forming therewith a reservoir, and an inlet for the reservoir in the cap.

This specification signed and witnessed this 11th day of March, A. D. 1907.

HENRY D. COOKE.
ALFRED FORNANDER.

Signed in the presence of—
AMBROSE L. O'SHEA,
FRANCIS E. VARNEY.